(12) United States Patent
Markham et al.

(10) Patent No.: US 10,280,897 B2
(45) Date of Patent: May 7, 2019

(54) METHODS AND SYSTEMS FOR CONTROLLING A WIND TURBINE

(71) Applicant: General Electric Company, Schenectady, NY (US)

(72) Inventors: Thomas Stephen Markham, Glenville, NY (US); Samuel Davoust, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 256 days.

(21) Appl. No.: 14/964,622

(22) Filed: Dec. 10, 2015

(65) Prior Publication Data

US 2017/0167470 A1    Jun. 15, 2017

(51) Int. Cl.
*F03D 7/04* (2006.01)
*F03D 7/02* (2006.01)
*G05B 13/02* (2006.01)

(52) U.S. Cl.
CPC ........... *F03D 7/042* (2013.01); *F03D 7/0204* (2013.01); *F03D 7/0224* (2013.01);
(Continued)

(58) Field of Classification Search
CPC ...... F05B 2270/8042; F05B 2240/2211; F05B 2270/1011
(Continued)

(56) References Cited

U.S. PATENT DOCUMENTS 6,320,272 B1 * 11/2001 Lading ................. F03D 7/0224
                                                       290/44
7,281,891 B2   10/2007 Smith et al.
(Continued)

FOREIGN PATENT DOCUMENTS

EP         2581761 A1    4/2013

OTHER PUBLICATIONS

Megie et al., "Complementarity of UV and IR differential absorption lidar for global measurements of atmospheric species" Applied Optics vol. 19, Issue 7, pp. 1173-1183 (1980).*
(Continued)

*Primary Examiner* — Emilio J Saavedra
(74) *Attorney, Agent, or Firm* — GE Global Patent Operation; Seema Katragadda

(57) ABSTRACT

A method for controlling a wind turbine includes receiving signals representative of oncoming wind speeds approaching at least a portion of a wind turbine, receiving background noise and signals representative of signal-to-noise ratios corresponding to the signals representative of the oncoming wind speeds, determining an availability-and-atmospheric noise in the signals based on one or more of the signal-to-noise ratios, blade positions of blades of the wind turbine, and the yaw position of a nacelle of the wind turbine, determining a wind incoherence noise in the signals due to a change in the oncoming wind speeds while approaching at least the portion of the wind turbine, determining a net measurement noise in the signals based on the background noise, the availability-and-atmospheric noise, and the wind incoherence noise, and controlling the wind turbine based at least on the signals representative of the oncoming wind speeds and the net measurement noise.

21 Claims, 4 Drawing Sheets

(52) U.S. Cl.
CPC ........ G05B 13/021 (2013.01); *F05B 2220/30* (2013.01); *F05B 2240/2211* (2013.01); *F05B 2250/232* (2013.01); *F05B 2270/1011* (2013.01); *F05B 2270/1033* (2013.01); *F05B 2270/32* (2013.01); *F05B 2270/8042* (2013.01); *Y02E 10/723* (2013.01)

(58) Field of Classification Search
USPC .......................................................... 700/28
See application file for complete search history.

(56) References Cited

U.S. PATENT DOCUMENTS

| | | |
|---|---|---|
| 2006/0140764 A1 | 6/2006 | Smith et al. |
| 2012/0120230 A1 | 5/2012 | Wilkerson et al. |
| 2012/0179376 A1 | 7/2012 | O'Brien et al. |
| 2013/0062880 A1 | 3/2013 | Bowyer et al. |
| 2013/0067921 A1 | 3/2013 | Hadley et al. |
| 2013/0094961 A1* | 4/2013 | Couchman ............... F03D 7/042 416/1 |
| 2013/0106107 A1 | 5/2013 | Spruce et al. |
| 2015/0247953 A1 | 9/2015 | O'Brien et al. |

OTHER PUBLICATIONS

Skinner et al., "A Comparative Study of Coherent & Incoherent Doppler Lidar Techniques" Study Report Prepared for Marshall Space Flight Center, Jun. 3, 1994, 98 Pgs.*

Scholbrock et al., "Field Testing LIDAR Based Feed-Forward Controls on the NREL Controls Advanced Research Turbine", National Renewable Energy Laboratory (NREL), p. 4 of pp. 1-10, Jan. 7-10, 2013.

Mirzaei et al., "An MPC approach to individual pitch control of wind turbines using uncertain LIDAR measurements", An MPC approach to individual pitch control of wind turbines using uncertain LIDAR measurements, pp. 492-493 of pp. 490-495, Jul. 17-19, 2013.

Ranneberg, "Sensor Setups for State and Wind Estimation for Airborne Wind Energy Converters", http://arxiv.org/pdf/1309.1029.pdf, pp. 1-17.Sep. 2013.

Davoust et al., "Assessment and Optimization of Lidar Measurement Availability for Wind Turbine Control", National Renewable Energy Laboratory (NREL), pp. 1-8, Mar. 10-13, 2014.

"Wind turbine Noise measurements", DNV GL AS 2015, https://www.dnvgl.com/services/wind-turbine-noise-measurements-3842, 2015.

Extended European Search Report and Opinion issued in connection with corresponding EP Application No. 17150174.5 dated Jul. 17, 2017.

* cited by examiner

METHODS AND SYSTEMS FOR CONTROLLING A WIND TURBINE

BACKGROUND

Embodiments of the present specification generally relate to a wind turbine and more specifically to systems and methods for controlling a wind turbine.

Wind turbines are growing in popularity as a means of generating energy due to the renewable nature of the energy so generated and lack of pollution. The wind turbines generally have a rotor with a plurality of blades coupled to a generator. The power extraction capability and secure operation of a wind turbine typically depends on various factors including wind speed. For example, knowledge of potential wind speeds that will impact the rotor of the wind turbine in the following few seconds may be helpful in controlling the wind turbine for optimal power extraction.

Wind speeds are typically measured by an anemometer such as a cup anemometer. However, anemometers are incapable of predicting the potential wind speeds that will impact the rotor of the wind turbine in the imminent future. Laser radar systems (LIDARs) have been employed for measuring wind speeds and direction of wind for many years. These LIDARs have been used to measure wind shear, turbulence and wake vortices in both military and civil applications. Typically, the laser radar system (LIDAR) operates by scattering radiation from natural aerosols (for example, dust, pollen, water droplets, and the like) and measuring the Doppler shift between outgoing and returning radiation. In order to measure wind speed and direction it is usual to scan the LIDAR, typically using a conical scan or multiple fixed beams to allow a wind vector to be intersected at a range of angles, thereby enabling a true (3D) velocity vector to be deduced. Other scanning patterns may also be used to determine the true velocity vector. However, the accuracy of determining the true velocity vector is dependent on knowledge regarding the direction of the LIDAR.

One of the advantages of LIDAR includes prediction of the potential wind speeds approaching the rotor of the wind turbine. For example, LIDARs may be used for providing wind speed measurements upto 400 m in front or ahead of the rotor of the wind turbine. Accordingly, the LIDAR may provide information regarding approaching wind speeds to a wind turbine controller in advance, thereby increasing the controller's available reaction time and allowing pitch actuation to occur in advance to mitigate wind disturbance effects. The wind turbine controller may use feed-forward control algorithms to improve load mitigation and controller performance.

Currently available LIDARs for use with wind turbines are impacted by surrounding atmospheric conditions and many other factors such as blade positions. Consequently, potential wind speeds measured by the LIDARs may be erroneous. Many such LIDARs provide a Boolean indicator (0 and 1) that indicates validity of signals representative of potential wind speeds. The Boolean indicators are often based on a signal to noise ratio (SNR) or measurement quality indication. The potential wind speeds that correspond to a zero Boolean indicator may be discarded due to lack of confidence. Usage of the Boolean indicator may impact availability of potential wind speeds. For example, usage of the Boolean indicator may result in substantially low or zero availability of potential wind speeds for a period of time. Non-availability or lower availability of potential wind speeds may impact the efficiency of wind turbines that use wind speeds determined by LIDARs.

Atmospheric conditions such as wind speed, turbulence intensity and turbulence length scales may influence wind speeds of wind travelling from LIDAR measurement points to the wind turbine. As per Taylor's hypothesis, in a high wind coherency situation, wind field variations travel from the LIDAR measurement points to the wind turbine almost unchanged. Hence, wind speeds determined during high wind coherency situations using LIDARs are typically accurate. However, in a low wind coherency situation, wind field variations may entirely change while travelling from the LIDAR measurement points to the wind turbine. Accordingly, wind coherency plays an important role in determination of wind speeds.

BRIEF DESCRIPTION

In accordance with aspects of the present specification, a method for controlling a wind turbine is presented. The method includes receiving signals representative of oncoming wind speeds approaching at least a portion of a wind turbine. Furthermore, the method includes receiving background noise and signals representative of signal-to-noise ratios corresponding to the signals representative of the oncoming wind speeds. In addition, the method includes determining an availability-and-atmospheric noise in the signals representative of the oncoming wind speeds based on one or more of the signal-to-noise ratios, blade positions of blades of the wind turbine, and a yaw position of a nacelle of the wind turbine. Moreover, the method includes determining a wind incoherence noise in the signals representative of the oncoming wind speeds due to a change in the oncoming wind speeds while approaching at least the portion of the wind turbine. The method also includes determining a net measurement noise in the signals representative of the oncoming wind speeds based on the background noise, the availability-and-atmospheric noise, and the wind incoherence noise. Additionally, the method includes controlling the wind turbine based at least on the signals representative of the oncoming wind speeds and the net measurement noise.

In accordance with another aspect of the present specification, a wind turbine system is presented. The wind turbine system includes a wind turbine including a rotor and a plurality of blades mounted on the rotor. Moreover, the system includes a LIDAR based sensing device disposed on the wind turbine and configured to measure signals representative of oncoming wind speeds approaching at least a portion of the wind turbine and signal-to-noise ratios corresponding to the signals representative of the oncoming wind speeds. In addition, the system includes a processing subsystem operatively coupled to the LIDAR based sensing device and the wind turbine and including a first noise-determination unit configured to determine an availability-and-atmospheric noise in the signals representative of the oncoming wind speeds based on one or more of the signal-to-noise ratios, blade positions of the plurality of blades, and a yaw position of a nacelle of the wind turbine, a second noise-determination unit configured to determine a wind incoherence noise in the signals representative of the oncoming wind speeds due to a change in the oncoming wind speeds while approaching at least the portion of the wind turbine, a third noise-determination unit configured to determine a net measurement noise in the signals representative of the oncoming wind speeds based on background noise, the availability-and-atmospheric noise, and the wind incoherence noise; and a control unit configured to control the wind turbine based on the signals representative of the oncoming wind speeds and the net measurement noise.

In accordance with yet another aspect of the present specification, a processing system for controlling a device is presented. The processing system includes a first noise-determination unit configured to determine an availability-and-atmospheric noise in signals representative of oncoming wind speeds based on signal-to-noise ratios, positions of one or more components of the device, and a determined transfer function. The processing system further includes a second noise-determination unit configured to determine a wind incoherence noise in the signals representative of the oncoming wind speeds due to a change in the oncoming wind speeds while approaching at least a portion of the device. Additionally, the processing system includes a third noise-determination unit configured to determine a net measurement noise in the signals representative of the oncoming wind speeds based on background noise, the availability-and-atmospheric noise, and the wind incoherence noise. Furthermore, the processing system includes a control unit configured to measure potential wind speeds impacting the device based on the signals representative of oncoming wind speeds and the net measurement noise.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
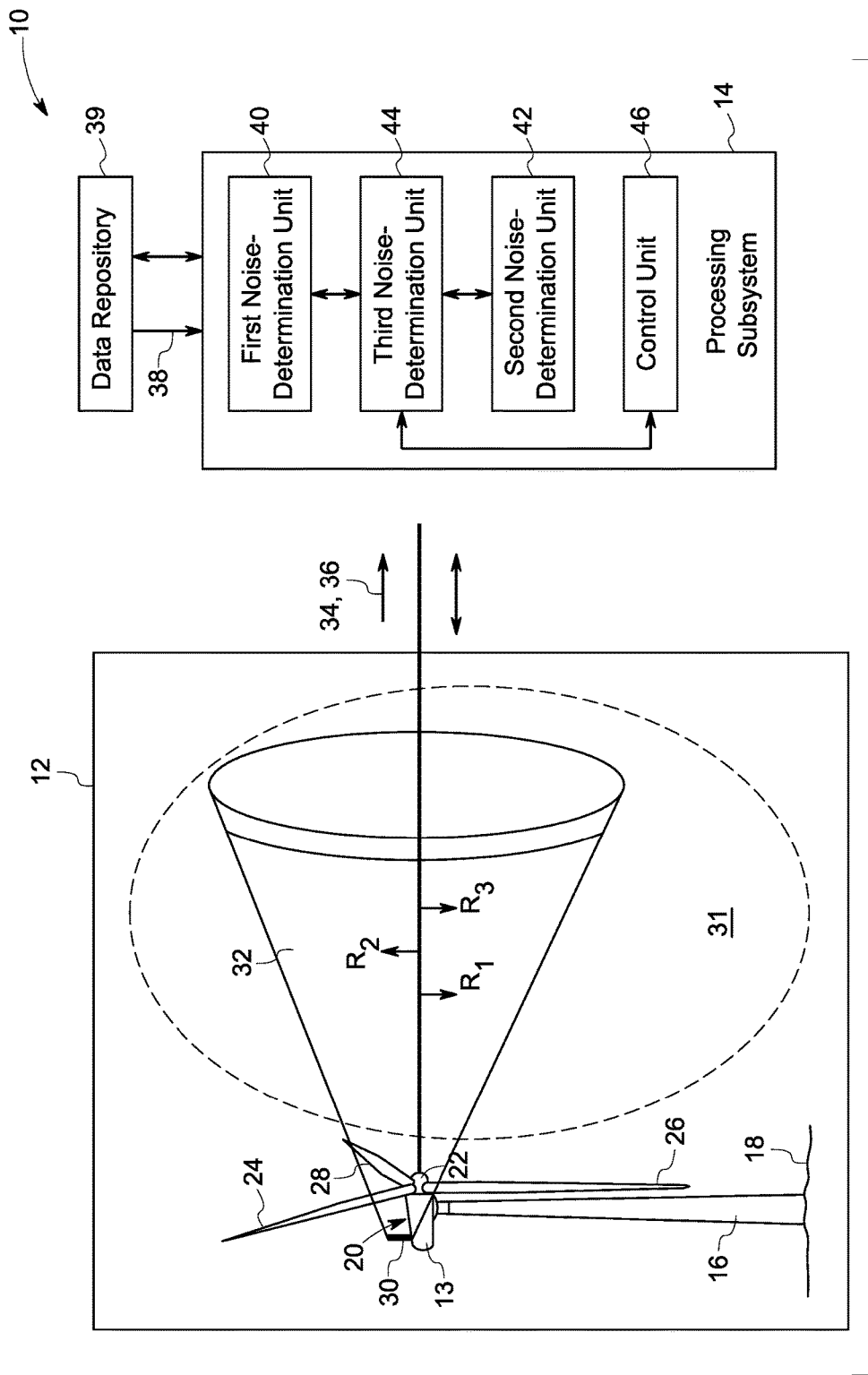
FIG. 1 is a diagrammatic illustration of a wind turbine system for controlling a wind turbine, in accordance with certain aspects of the present specification.

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be described in detail hereinafter, various embodiments of systems and methods for controlling a device are presented. In one embodiment, the device may be representative of devices used for measuring/monitoring wind speeds. Some examples of such a device include, but are not limited to, an aircraft engine, a wind turbine, and an anemometer. It may be noted that while the present systems and methods are described with reference to a wind turbine, the present systems and methods may also be used with other devices employed for monitoring wind speeds. Moreover, the systems and methods measure oncoming wind speeds and net measurement noise in the oncoming wind speeds of a wind turbine. Additionally, the systems and methods provide accurate estimates of potential wind speeds that may impact the wind turbine in near future, and control the wind turbine based on the estimated potential wind speed, the oncoming wind speeds, and/or the net measurement noise of the wind turbine for optimal operation of the wind turbine.

FIG. 1 is a diagrammatic illustration of a wind turbine system 10 for controlling a wind turbine 12, in accordance with certain aspects of the present specification. In one exemplary embodiment, the wind turbine system 10 includes the wind turbine 12 and a processing subsystem 14 operatively coupled to the wind turbine 12. In this embodiment, the wind turbine 12 is a horizontal-axis wind turbine. Alternatively, the wind turbine 12 may be a vertical-axis wind turbine.

The wind turbine 12 includes a tower 16 that extends from a support system 18, a nacelle 13 mounted on the tower 16, and a rotor 20 that is coupled to the nacelle 13. The rotor 20 includes a rotatable hub 22 and one or more rotor blades 24, 26, 28 coupled to and extending outward from the hub 22. In a presently contemplated configuration, the rotor 20 has three rotor blades 24, 26, 28. In an alternative embodiment, the rotor 20 includes more or less than three rotor blades 24, 26, 28. The rotor blades 24, 26, 28 are made of a non-conductive material. By way of a non-limiting example, the rotor blades 24, 26, 28 of the wind turbine 12 are made of a non-conductive composite material such as fiber glass. In addition, the rotor blades 24, 26, 28 may also be coated with a conductive or a non-conductive material. The rotor blades 24, 26, 28 are arranged around the hub 22. The rotor blades 24, 26, 28 are mated to the hub 22 by coupling a root of a blade to a respective slot (not shown) in the hub 22. For example, the root (not shown) of the rotor blade 24 is mated to the hub 22 by coupling the root of the blade 24 to a slot (not shown) in the hub 22.

The wind turbine system 10 further includes a LIDAR based sensing device 30 disposed on or about the wind turbine 12. For example, the LIDAR based sensing device 30 may be disposed on or inside one or more of the nacelle 13, the hub 22, and a spinner of the rotor 20, and/or at the bottom of the tower 16. Also, in scenarios where the present systems and methods are applied to devices other than wind turbines, the LIDAR based sensing device 30 may be disposed on or inside one or more components of such devices. In the presently contemplated configuration of FIG. 1, the LIDAR based sensing device 30 is located on the nacelle 13. The LIDAR based sensing device 30, for example, may be a pulsed LIDAR, a continuous LIDAR, a Doppler pulsed LIDAR, or a Non-Doppler wind speed remote sensing device. The LIDAR based sensing device 30, for example, scans area 31 in the vicinity of the wind turbine 12. The LIDAR based sensing device 30 may scan the area 31 using a laser 32. The scan pattern of the laser 32 may be of different shapes. In the embodiment of FIG. 1, the scan pattern of the laser 32 is conical.

Furthermore, the LIDAR based sensing device 30 measures oncoming wind speeds approaching at least a portion of the wind turbine 12 using the scan of the area 31. The LIDAR based sensing device 30, for example, may measure the oncoming wind speeds at a plurality of range locations. As used herein, the term "range location" refers to a position at a determined distance in front of the wind turbine 12 corresponding to which the LIDAR based sensing device 30 measures an oncoming wind speed. For example, the range locations may be locations at a distance of 50 meters, 100 meters, and the like, upstream from the plane of the rotor 20.

An oncoming wind speed corresponding to a range location is hereinafter referred to as a range wind speed. Accordingly, the oncoming wind speeds at the plurality of range locations include a plurality of range wind speeds corresponding to the plurality of the range locations. For example, in the presently contemplated configuration, the LIDAR based sensing device 30 measures oncoming wind speeds or range wind speeds $RW_1$, $RW_2$, $RW_3$ at range locations $R_1$, $R_2$, and $R_3$, respectively. In another example, the oncoming wind speeds may include multiple range wind speeds at each of the range locations. It may be noted that for ease of illustration, the example of FIG. 1 depicts a single range wind speed $RW_1$, $RW_2$, $RW_3$, corresponding to each range location $R_1$, $R_2$, and $R_3$, respectively.

Additionally, the LIDAR based sensing device 30 is configured to generate signals 34 representative of the measured oncoming wind speeds. The LIDAR based sensing device 30 is further configured to transmit the signals 34 representative of the oncoming wind speeds to the processing subsystem 14. The LIDAR based sensing device 30 is also configured to determine signal-to-noise ratio (SNR) in the signals 34 representative of the oncoming wind speeds, and generate signals 36 representative of the SNR. For each measured oncoming wind speed, the SNR is a measure of an amount and quality of optical signal backscattered from the atmosphere with respect to an amount and quality of an optical signal emitted from the LIDAR based sensing device 30. Accordingly, the SNR is a measure of the quality of the signals 34. For example, when the SNR is high in the signals 34, the signals 34 may not contain any noise other than background noise 38 encountered by the LIDAR based sensing device 30 while measuring the oncoming wind speeds. Similarly, when the SNR is low in the signals 34, the signals 34 may contain noise in addition to the background noise 38. Furthermore, the LIDAR based sensing device 30 transmits the signals 36 representative of the SNR to the processing subsystem 14.

In addition to the LIDAR based sensing device 30, the wind turbine 12 may include one or more devices (not shown) that are configured to measure information related to the wind turbine 12. These devices, for example, may be disposed on or inside the wind turbine 12. The information, for example, may include blade positions of the blades 24, 26, 28, yaw position of the nacelle 13, and the like. The blade positions of the blades 24, 26, 28, for example may include blade azimuthal and/or pitch positions of blades 24, 26, 28. In the example where the present systems and methods are applied to devices other than a wind turbine, the information may include positions of one or more components of the devices.

As previously noted, while measuring the oncoming wind speeds and generating and transmitting the signals 34 to the processing subsystem 14, the LIDAR based sensing device 30 may encounter background noise 38 in the signals 34 representative of the oncoming wind speeds. The background noise 38 in the signals 34 may be computed by a user or a processor (not shown) before or after commissioning of the wind turbine 12. The background noise 38, for example may be stored in a data repository 39. When the LIDAR based sensing device 30 is a pulsed LIDAR, the background noise 38, for example may be determined using equation (1).

$$\sigma_{Bckgd} = \frac{\lambda}{c\sqrt{N}\,\pi\tau_c} \quad (1)$$

where $\sigma_{Bckgd}$ is the background noise, $\lambda$ is a wavelength of the laser 32, c is a constant, N is a number of pulses of the laser 32 used for measuring the signals 34 representative of the oncoming wind speeds, and $\tau_c$ is a correlation time.

For a pulsed LIDAR based sensing device, the background noise 38, for example may fall in range of about 0.05 meter/second to about 1 meter per second. For other LIDAR based sensing devices including continuous wave LIDAR based sensing devices or non-Doppler LIDAR based sensing devices, the background noise 38 may fall in other ranges. The processing subsystem 14 receives the signals 34, 36 from the LIDAR based sensing device 30, and the information related to the wind turbine 12 from the other devices. Furthermore, the processing subsystem 14 retrieves the background noise 38 from the data repository 39.

The processing subsystem 14, for example, may include a digital signal processor, a microprocessor, a microcomputer, a microcontroller, and/or any other suitable device. In the presently contemplated configuration, the processing subsystem 14 includes a first noise-determination unit 40, a second noise-determination unit 42, a third noise-determination unit 44, and a control unit 46. The noise-determination units 40, 42, 44 and the control unit 46 may be a digital signal processor, a microprocessor, a microcomputer, a microcontroller, a module and/or any other suitable device. It may be noted that while in the presently contemplated configuration, the noise-determination units 40, 42, 44 and the control unit 46 are shown as a part of the single processing subsystem 14, in certain embodiments, one or more of the units 40, 42, 44, 46 may be independent processing units. It may also be noted that the first, second, and third noise-determination units 40, 42, 44 may be respectively configured to determine a first, second, and third noise. In one example, the first noise may be referred to as availability-and-atmospheric noise, the second noise may be referred to as wind incoherence noise, and the third noise may be referred to as net measurement noise.

In the presently contemplated configuration, the first noise-determination unit 40 is configured to determine availability-and-atmospheric noise in the signals 34 representative of the oncoming wind speeds based on a category of the LIDAR sensing device 30, one or more of the signal-to-noise ratios (SNRs), the blade positions including the blade azimuthal and/or pitch positions of the blades 24, 26, 28, a yaw position of the nacelle 13 of the wind turbine 12, and a determined transfer function. As used herein, the term "category of the LIDAR based sensing device" refers to a type of a LIDAR based sensing device. For example, the category of LIDAR based sensing device may include a pulsed LIDAR, a continuous LIDAR, or a Doppler pulsed LIDAR. Also, as used herein, the term "availability-and-atmospheric noise" refers to noise introduced in the signals 34. Determination of the availability-and-atmospheric noise will be described in greater detail with reference to FIG. 2.

As previously noted, the processing subsystem 14 further includes the second noise-determination unit 42. The second noise-determination unit 42 is configured to determine wind incoherence noise in the signals 34. The wind incoherence noise is introduced in the signals 34 due to changes in the oncoming wind speeds while approaching the wind turbine 12. For example, an oncoming wind speed of the wind at the range location $R_3$ may be 10 meters per second. The oncoming wind speed may reduce to 1 meter per second when the wind reaches the range location $R_2$. The change in the oncoming wind speed, for example, may be due to surrounding atmospheric conditions of the wind turbine 12. The second noise-determination unit 42, for example, may determine the wind incoherence noise based on cross-correlation coefficients. The cross-correlation coefficients are determined based on the range wind speeds corresponding to the range locations. For example, a cross-correlation coefficient $CC_{12}$ between the range wind speed $RW_1$ at the range location $R_1$ and the range wind speed $RW_2$ at the range location $R_2$ may be determined. Similarly, a cross-correlation coefficient $CC_{13}$ between the range wind speed $RW_1$ at the range location $R_1$ and the range wind speed $RW_3$ at the range location $R_3$ may be determined. Also, a cross-correlation coefficient $CC_{23}$ between the range wind speed $RW_2$ at the range location $R_2$ and the range wind speed $RW_3$ at the range location $RW_2$ may be determined. Subsequently, the wind incoherence noise may be determined based on the coefficients $CC_{12}$, $CC_{13}$ and $CC_{23}$. Wind incoherence noise, for example may be determined in real-time or offline based on previous observations. Determination of the wind incoherence noise will be described in greater detail with reference to FIG. 3.

Moreover, the third noise-determination unit 44 is coupled to the first-noise determination unit 40, the second noise-determination unit 42, and the LIDAR based sensing device 30. The third noise-determination unit 44 is configured to determine a net measurement noise in the signals 34 representative of the oncoming wind speeds based on the background noise, the availability-and-atmospheric noise, and the wind incoherence noise. For example, the third noise-determination unit 44 determines the net measurement noise by determining a square root of a sum of squares of the background noise, the availability-and-atmospheric noise, and the wind incoherence noise. One example of the determination of the net measurement noise is shown in equation (2).

$$\sigma_{meas} = \sqrt{\sigma_{Bckgd}^2 + \sigma_{avat}^2 + \sigma_{coh}^2} \qquad (2)$$

where $\sigma_{meas}$ is representative of the net measurement noise, a $\sigma_{Bckgd}$ is representative of the background noise, $\sigma_{avat}$ is representative of the availability-and-atmospheric noise, and $\sigma_{coh}$ is representative of the wind incoherence noise.

Additionally, the control unit 46 is operatively coupled to the third noise-determination unit 44. The control unit 46, for example, may accurately estimate wind speeds that impact the wind turbine 12 based on the net measurement noise and the oncoming wind speeds. For example, the control unit 46 may subtract the net measurement noise from the oncoming wind speeds to estimate the wind speeds that impact the wind turbine 12. The control unit 46 further controls the wind turbine 12 based on one or more of the signals 34 representative of the oncoming wind speeds, the net measurement noise, and the estimated wind speeds that impact the wind turbine 12. As used herein, the term "estimated wind speed" refers to a wind speed that impinges on or impacts the wind turbine 12. For example, the oncoming wind speeds are representative of speeds ahead of or in front of the wind turbine 12, while the estimated wind speeds are representative of wind speeds that impinge on the wind turbine 12. Subsequent to the determination of the estimated wind speeds, the control unit 46 may control the wind turbine 12 by changing pitch angles of the blades 24, 26, 28 based on the signals 34 representative of the oncoming wind speeds and the net measurement noise. In one embodiment, the control unit 46 may use the net measurement noise and the oncoming wind speeds for feed forward controls to reduce loads on the blades 24, 26, 28 and tower 16, and enable enhanced speed tracking to avoid over-speed and/or improve yaw tracking.

Figure 2:
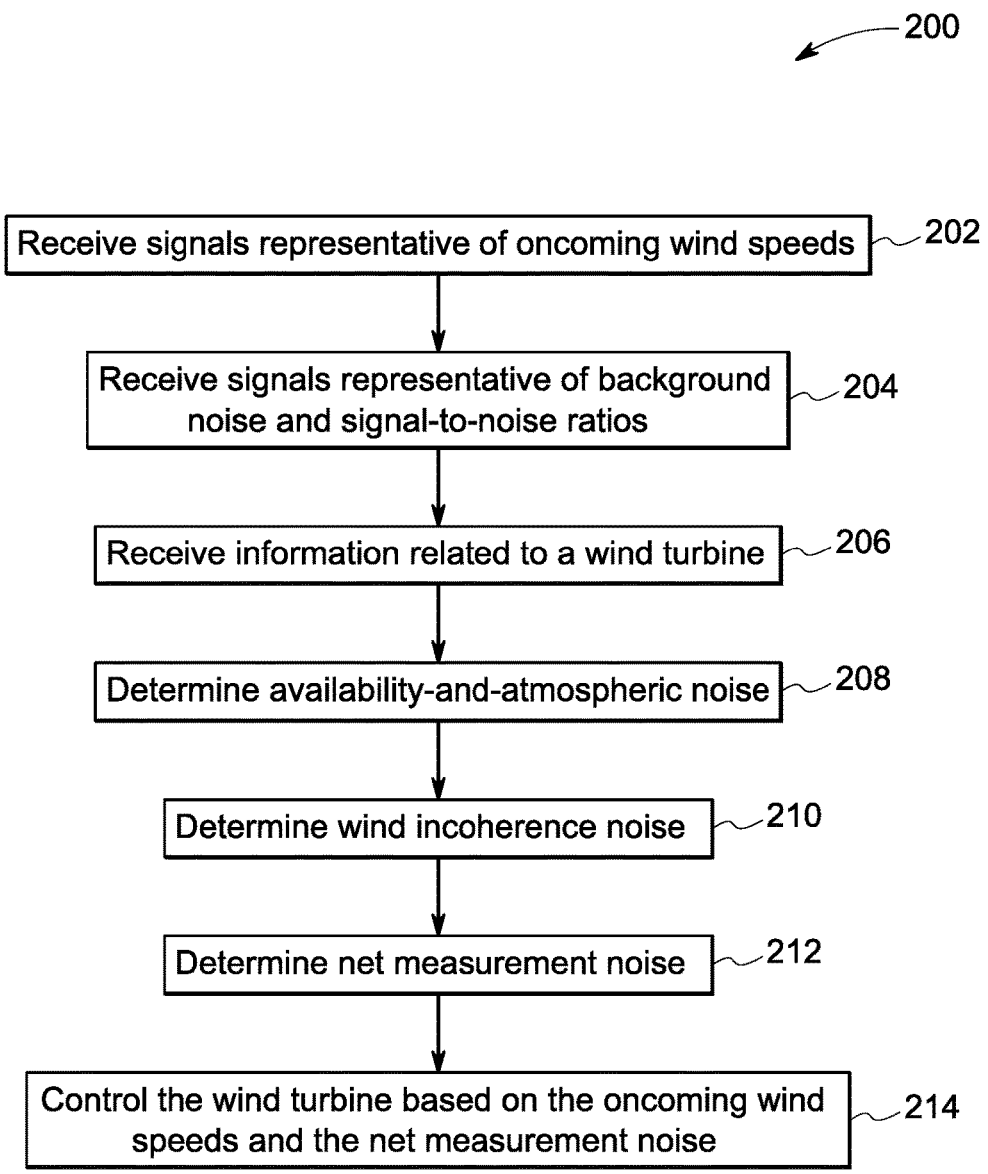
FIG. 2 is a flow chart illustrating a method for controlling a wind turbine, in accordance with certain aspects of the present specification.

FIG. 2 is a flow chart illustrating a method 200 for controlling a wind turbine, in accordance with certain aspects of the present specification. The method of FIG. 2 is described with reference to the components of FIG. 1. At block 202, signals 34 representative of oncoming wind speeds may be received. As previously noted with reference to FIG. 1, the oncoming wind speeds may include a plurality of range wind speeds corresponding to a plurality of range locations. For example, the oncoming wind speeds include range wind speeds corresponding to the range location $R_1$.

Furthermore, at block 204, background noise 38, signals 34 representative of the oncoming wind speeds and signals 36 representative of SNRs may be received. The signals 34, 36 representative of the oncoming wind speeds and SNRs are generated by the LIDAR based sensing device 30.

In addition, at block 206, information related to the wind turbine 12 may be received. The information, for example, may include the blade positions of the plurality of blades 24, 26, 28 of the wind turbine 12, a yaw position of the nacelle 13, and the like. Also, at block 208, availability-and-atmospheric noise may be determined based on one or more of the SNRs, blade positions, and yaw position of the nacelle 13. The availability-and-atmospheric noise, for example, may be determined by computing an exponential function of the SNRs. Moreover, the availability-and-atmospheric noise, for example, may be determined using the first noise-determination unit 40. The determination of the availability-and-atmospheric noise will be described in greater detail with reference to FIG. 3.

In addition, at block 210, wind incoherence noise may be determined. In one example, the wind incoherence noise may be determined by the second noise-determination unit 42. The determination of the wind incoherence noise will be described in greater detail with reference to FIG. 4.

Additionally, at block 212, net measurement noise may be determined based on the background noise, the availability-and-atmospheric noise, and the wind incoherence noise. The net measurement noise, for example may be determined by computing a square root of a sum of squares of the background noise, the availability-and-atmospheric noise, and the wind incoherence noise. In one example, the net measurement noise may be determined by the third noise-determination unit 44 based on equation (2).

Moreover, at block 214, the wind turbine 12 may be controlled based on the oncoming wind speeds and/or the net measurement noise. Block 214, for example may be executed by the control unit 46 of FIG. 1. In one embodiment, wind speed that will impact the wind turbine 12 may be estimated based on the oncoming wind speeds and/or the net measurement noise. As previously noted, the estimated wind speeds are representative of the speed of the wind that impinges on the wind turbine 12. Also, one or more of the estimated wind speeds, the oncoming wind speeds, and the net measurement noise may be provided to feed-forward control processes to control the wind turbine 12. For example, pitch angle of blades 24, 26, 28 of the wind turbine 12 may be changed to reduce loads or increase power output. In some embodiments, the yaw position of the nacelle 13 may be changed based on the oncoming wind speeds and/or the net measurement noise.

Figure 3:
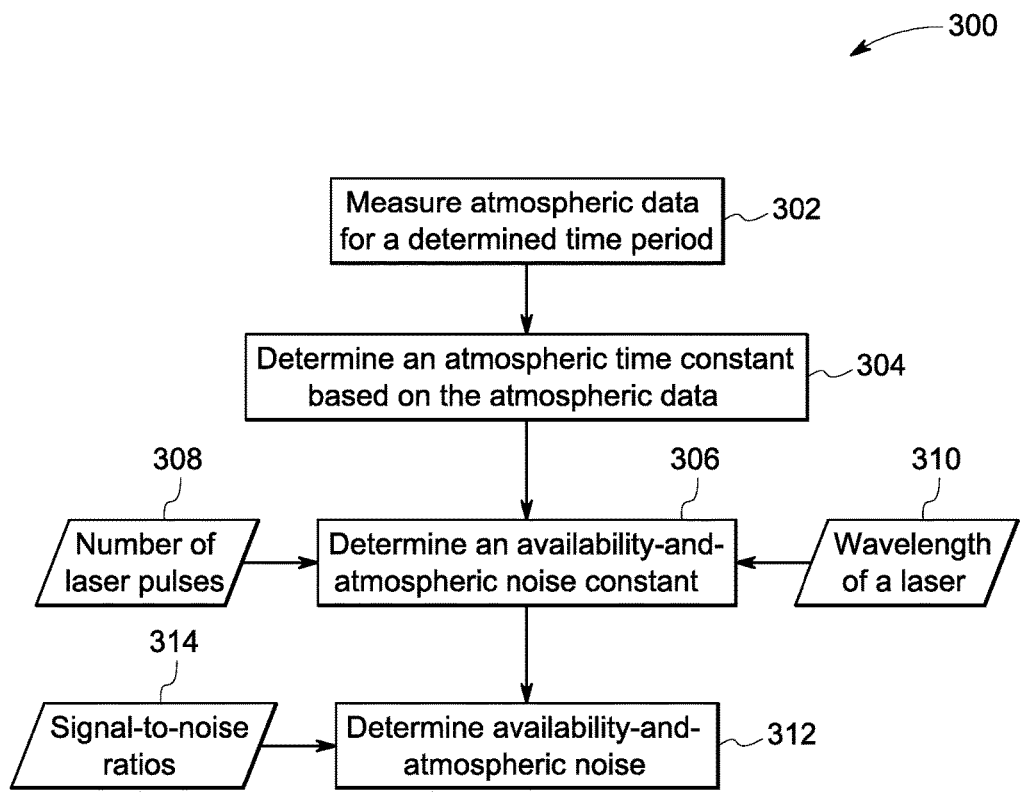
FIG. 3 is a flow chart illustrating a method for determining availability-and-atmospheric noise, in accordance with certain aspects of the present specification.

Referring now to FIG. 3, a flow chart illustrating a method 300 for determining availability-and-atmospheric noise, in accordance with certain aspects of the present specification, is presented. The method 300, for example, corresponds to block 208 of FIG. 2. Also, the method 300 is described with reference to the components of FIGS. 1-2.

The method 300, for example, may be executed by the first noise-determination unit 40. At block 302, atmospheric data corresponding to a determined time period at a potential location of installation of the wind turbine 12 may be determined. The atmospheric data, for example, may include visibility, SNR, or LIDAR availability. Moreover, the atmospheric data, for example may be measured by a LIDAR based on the ground or on the wind turbine 12 or by a nearby meteorological station providing measurements of optical atmospheric properties, such as visibility. Alternatively, atmospheric data may be gathered during an initial phase once the wind turbine with the LIDAR based sensing device begins operation.

Furthermore, at block 304, an atmospheric constant may be determined based on the atmospheric data. The atmospheric constant, for example, may be determined by fitting a curve to the atmospheric data. Additionally, at block 306, an availability-and-atmospheric noise constant may be determined based on one or more of a number of laser pulses 308 used for measuring the signals 34 representative of the oncoming wind speeds, a wavelength 310 of the laser 32 used for measuring the signals 34 representative of the oncoming wind speeds, and the atmospheric constant. In one embodiment, the availability-and-atmospheric noise constant may be determined using equation (3).

$$a = \left( \frac{\sqrt{2}\, l}{2\tau\sqrt{N}} \right) \quad (3)$$

where a is the availability-and-atmospheric noise constant, l is the wavelength of the laser 32, τ is atmospheric constant, and N is a number of laser pulses used for measuring the signals 34 representative of oncoming wind speeds.

Moreover, at block 312, the availability-and-atmospheric noise may be determined based on signal-to-noise ratios 314 and the availability-and-atmospheric noise constant. As previously noted, the SNRs 314, for example, may be the signal to noise ratio (SNR) in the signals 34 representative of the oncoming wind speeds. Moreover, in one embodiment, the SNRs 314 may be representative of the signals 36 representative of the SNRs. In one example, the availability-and-atmospheric noise may be determined using equation (4).

$$\sigma_{avat} = a\sqrt{\frac{1 + e^{CNR}}{e^{CNR}}} \quad (4)$$

where $\sigma_{avat}$ is availability-and-atmospheric noise, a is the availability-and-atmospheric noise constant determined using equation (3), and CNR is a logarithmic signal-to-noise ratio.

Figure 4:
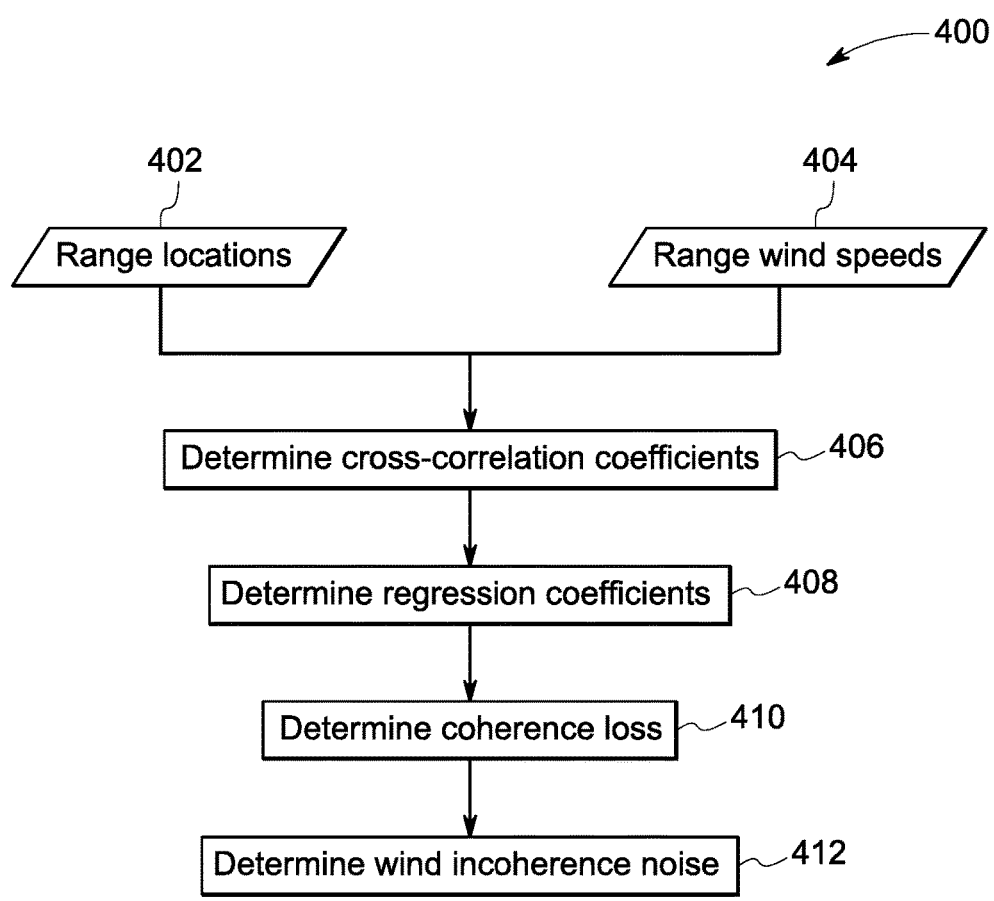
FIG. 4 is a flow chart illustrating a method for determining wind incoherence noise, in accordance with certain aspects of the present specification.

Turning now to FIG. 4, a flow chart illustrating a method 400 for determining wind incoherence noise, in accordance with certain aspects of the present specification, is presented. The method 400 corresponds to block 210 of FIG. 2. Moreover, the method 400 may be executed by the second noise-determination unit 42 of FIG. 1. Also, the method 400 is described with reference to the components of FIGS. 1-2.

Reference numeral 402 is representative of a plurality of range locations ahead of a wind turbine, in an upwind direction from the wind turbine. Also, reference numeral 404 is representative of range wind speeds corresponding to the plurality of range locations 402. Moreover, as previously noted, the range wind speeds may be measured by the LIDAR based sensing device 30 disposed on the wind turbine 12. In one example, the range locations 402 may include the range locations $R_1$, $R_2$, $R_3$ and the range wind speeds 404 may include the range wind speeds $RW_1$, $RW_2$, $RW_3$ of FIG. 1.

At block 406, cross-correlation coefficients may be determined. The cross-correlation coefficients are representative of a relationship between the range wind speeds 404 that correspond to a plurality of distances between the plurality of range locations 402. By way of example, one or more cross-correlation coefficients between the range wind speeds $RW_1$ and $RW_2$ corresponding to a distance between the range locations $R_1$ and $R_2$ may be determined. Similarly, one or more cross-correlation coefficients between the range wind speeds $RW_1$ and $RW_3$ corresponding to a distance between the range locations $R_1$ and $R_3$ may be determined. In a similar fashion, one or more cross-correlation coefficients between the range wind speeds $RW_2$ and $RW_3$ corresponding to a distance between the range locations $R_2$ and $R_3$ may be determined. For example, the cross-correlation coefficients may be determined using a cross-correlationship function. In one example, the cross-correlation coefficients may be determined using equation (5).

$$CC_{ij} = \frac{\max_d [\langle U_i(t) U_j(t+\sigma) \rangle]}{\langle U_i^2(t) \rangle \langle U_{j}^2(t) \rangle} \quad (5)$$

where i is a first range location, j is a second range location, $CC_{ij}$ is a cross-correlation coefficient corresponding to a distance between the range locations i and j, Ui(t) is a first range wind speed at a range location i at time stamp t, and Uj(t) is a second range wind speed at a range location j, Uj(t+σ) is a third range wind speed at the range location j and at time stamp (t+σ).

Furthermore, at block 408, regression coefficients may be determined based on the cross-correlation coefficients and the distances between the range locations. The regression coefficients, for example, may be determined by applying a regression analysis technique to the cross-correlation coefficients and the distances between the between the range locations 402. In one example, the regression coefficients may be determined using equation (6).

$$[p_2, p_1, p_0] = \text{Quadratic Fit}(\Delta x, CC_{ij}) \quad (6)$$

where $p_2$, $p_1$, $p_0$ are regression coefficients, $\Delta x$ are distances between the range locations i and j, and $CC_{ij}$ are cross-correlation coefficients.

Additionally, at block 410, coherence loss may be determined. The coherence loss, for example, may be determined based on the regression coefficients and the distances between the plurality of range locations 402. As used herein, the term "coherence loss" indicates a change in a range wind speed or an oncoming wind speed when wind travels from one range location to another range location. The coherence loss, in one example, may be determined using equation (7).

$$f_{cc}(\Delta x) = p_2 \Delta x^2 + p_1 \Delta x + p_0 \quad (7)$$

where $f_{cc}(\Delta x)$ is the coherence loss corresponding to a distance $\Delta x$.

Moreover, at block 412, wind incoherence noise may be determined. In one embodiment, the wind incoherence noise may be determined based on the coherence loss. One example of determining the coherence loss is provided in equation (8).

$$\sigma_{coh} = \sqrt{2} \sqrt{1 - f_{cc}(\Delta x)} \quad (8)$$

where $\sigma_{coh}$ is wind incoherence loss.

The systems and methods for controlling the device presented hereinabove provide accurate estimates of potential wind speeds based on the oncoming wind speeds and the net measurement noise. Furthermore, the systems and methods allow enhanced control of the device. In particular, the systems and methods allow use of the net measurement noise, the oncoming wind speeds, and/or the accurate estimates of the potential wind speeds for feed-forward controls to reduce loads on the blades and the tower of a wind turbine. Hence, the systems and methods enable accurate potential wind speed tracking to avoid over-speed and/or improve yaw tracking. Additionally, the systems and methods increase instances of availability of signals from the LIDAR based sensing device even in rough atmospheric conditions by determining net measurement noise. Accordingly, use of the present systems and methods allows net measurement noise to be determined even in rough atmospheric conditions, thereby enabling determination of the accurate estimates of the potential wind speeds even in rough atmospheric conditions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a wind turbine, comprising:
   receiving signals representative of oncoming wind speeds approaching at least a portion of a wind turbine;
   receiving background noise and signals representative of signal-to-noise ratios corresponding to the signals representative of the oncoming wind speeds;
   determining an availability-and-atmospheric noise in the signals representative of the oncoming wind speeds based on one or more of the signal-to-noise ratios, blade positions of blades of the wind turbine, and a yaw position of a nacelle of the wind turbine;
   determining a wind incoherence noise in the signals representative of the oncoming wind speeds due to a change in the oncoming wind speeds while approaching at least the portion of the wind turbine, wherein determining the wind incoherence noise comprises:
      determining a plurality of cross-correlation coefficients corresponding to a plurality of distances between a plurality of range locations;
      determining a plurality of regression coefficients based on the plurality of cross-correlation coefficients and the plurality of distances between the plurality of range locations;
      determining coherence loss based on the plurality of regression coefficients and the plurality of distances between the plurality of range locations;
      determining the wind incoherence noise based on the coherence loss;
   determining a net measurement noise in the signals representative of the oncoming wind speeds based on the background noise, the availability-and-atmospheric noise, and the wind incoherence noise; and
   controlling the wind turbine based at least on the signals representative of the oncoming wind speeds and the net measurement noise.

2. The method of claim 1, wherein determining the net measurement noise comprises determining a square root of a sum of squares of the background noise, the availability-and-atmospheric noise, and the wind incoherence noise.

3. The method of claim 1, further comprising:
   measuring atmospheric data for a determined time period at a potential location of installation of the wind turbine; and
   determining an atmospheric constant based on the atmospheric data.

4. The method of claim 3, wherein determining the atmospheric constant comprises fitting a curve to the atmospheric data.

5. The method of claim 4, wherein determining the availability-and-atmospheric noise in the oncoming wind speeds comprises:

determining an availability-and-atmospheric noise constant based on one or more of a number of laser pulses used for measuring the signals representative of the oncoming wind speeds, the atmospheric constant, and a wavelength of a laser used for measuring the signals representative of the oncoming wind speeds; and determining the availability-and-atmospheric noise based on the signal-to-noise ratios and the availability-and-atmospheric noise constant.

6. The method of claim 1, wherein determining the availability-and-atmospheric noise comprises determining an exponential function of the signal-to-noise ratios.

7. The method of claim 1, wherein receiving the signals representative of the oncoming wind speeds comprises receiving signals representative of range wind speeds at the plurality of range locations, and wherein the range wind speeds comprise at least a first range wind speed and a second range wind speed.

8. The method of claim 1, wherein determining the plurality of regression coefficients comprises applying a regression analysis technique to the plurality of cross-correlation coefficients and the plurality of distances between the plurality of range locations.

9. The method of claim 7, wherein determining the plurality of cross-correlation coefficients comprises:
determining the first range wind speed at a first range location in the plurality of range locations;
determining the second range wind speed at a second range location in the plurality of range locations; and
applying a cross-relationship function to the first range wind speed and the second range wind speed to determine the plurality of cross-correlation coefficients.

10. The method of claim 1, wherein controlling the wind turbine comprises changing pitch angles of a plurality of blades of the wind turbine.

11. A wind turbine system, comprising:
a wind turbine comprising a rotor and a plurality of blades mounted on the rotor;
a LIDAR based sensing device disposed on the wind turbine and configured to measure signals representative of oncoming wind speeds approaching at least a portion of the wind turbine and signal-to-noise ratios corresponding to the signals representative of the oncoming wind speeds;
a processing subsystem operatively coupled to the LIDAR based sensing device and the wind turbine and comprising:
a first noise-determination unit configured to determine an availability-and-atmospheric noise in the signals representative of the oncoming wind speeds based on one or more of the signal-to-noise ratios, blade positions of the plurality of blades, and a yaw position of a nacelle of the wind turbine;
a second noise-determination unit configured to determine a wind incoherence noise in the signals representative of the oncoming wind speeds due to a change in the oncoming wind speeds while approaching at least the portion of the wind turbine wherein to determine the wind incoherence noise in the signals representative of the oncoming wind speeds, the second noise-determination unit is configured to:
determine a plurality of cross-correlation coefficients corresponding to a plurality of distances between a plurality of range locations;
determine a plurality of regression coefficients based on the plurality of cross-correlation coefficients and the plurality of distances between the plurality of range locations;
determine coherence loss based on the plurality of regression coefficients and the plurality of distances between the plurality of range locations;
determine the wind incoherence noise based on the coherence loss;
a third noise-determination unit configured to determine a net measurement noise in the signals representative of the oncoming wind speeds based on background noise, the availability-and-atmospheric noise, and the wind incoherence noise; and
a control unit configured to control the wind turbine based on the signals representative of the oncoming wind speeds and the net measurement noise.

12. The wind turbine system of claim 11, wherein the LIDAR based sensing device comprises a pulsed LIDAR, a continuous LIDAR, or a Doppler pulsed LIDAR.

13. The wind turbine system of claim 11, wherein the LIDAR based sensing device is disposed on or inside one or more of a nacelle of the wind turbine, a hub of the wind turbine, and a spinner of the rotor, at the bottom of the tower, or combinations thereof.

14. The wind turbine system of claim 11, wherein the third noise-determination unit is further configured to determine the net measurement noise by determining a square root of a sum of squares of the background noise, the availability-and-atmospheric noise, and the wind incoherence noise.

15. The wind turbine system of claim 11, wherein the first noise-determination unit is configured to:
determine an availability-and-atmospheric noise constant based on one or more of a number of laser pulses used for measuring the signals representative of the oncoming wind speeds, an atmospheric constant, and a wavelength of a laser used for measuring the signals representative of the oncoming wind speeds; and
determine the availability-and-atmospheric noise based on the signal-to-noise ratios and the availability-and-atmospheric noise constant.

16. The wind turbine system of claim 11, wherein the availability-and-atmospheric noise is an exponential function of the signal-to-noise ratios.

17. The wind turbine system of claim 11, wherein the oncoming wind speeds comprises range wind speeds at a plurality of range locations.

18. The wind turbine system of claim 11, wherein the second noise-determination unit is configured to determine the plurality of regression coefficients by applying a regression analysis technique to the plurality of cross-correlation coefficients and the plurality of distances between the between the plurality of range locations.

19. A processing system for controlling a device, the system comprising:
a first noise-determination unit configured to determine an availability-and-atmospheric noise in signals representative of oncoming wind speeds based on signal-to-noise ratios, positions of one or more components of the device, and a determined transfer function;
a second noise-determination unit configured to determine a wind incoherence noise in the signals representative of the oncoming wind speeds due to a change in the oncoming wind speeds while approaching at least a portion of the device, wherein to determine the wind incoherence noise in the signals representative of the oncoming wind speeds, the second noise-determination unit is configured to:
    determine a plurality of cross-correlation coefficients corresponding to a plurality of distances between a plurality of range locations;
    determine a plurality of regression coefficients based on the plurality of cross-correlation coefficients and the plurality of distances between the plurality of range locations;
    determine coherence loss based on the plurality of regression coefficients and the plurality of distances between the plurality of range locations;
    determine the wind incoherence noise based on the coherence loss;
a third noise-determination unit configured to determine a net measurement noise in the signals representative of the oncoming wind speeds based on background noise, the availability-and-atmospheric noise, and the wind incoherence noise; and
a control unit configured to measure potential wind speeds impacting the device based on the signals representative of oncoming wind speeds and the net measurement noise.

20. The system of claim 19, wherein the device comprises an aircraft engine, an anemometer, a wind turbine, or combinations thereof.

21. The system of claim 20, wherein the control unit is configured to control the device based on the signals representative of the oncoming wind speeds and the net measurement noise.

* * * * *